INVENTOR
David M. Robertson
BY Townshend & [illegible]
ATTORNEYS

United States Patent Office 3,509,893
Patented May 5, 1970

3,509,893
ACCELERATION RESPONSIVE FLUID FLOW REGULATORS
David M. Robertson, Kirkcaldy, Fife, Scotland, assignor to The British Oxygen Company Limited, a British company
Filed Apr. 20, 1967, Ser. No. 632,325
Claims priority, application Great Britain, Apr. 22, 1966, 17,698/66
Int. Cl. G05b; G05d
U.S. Cl. 137—38                                                        4 Claims

ABSTRACT OF THE DISCLOSURE

A fluid-flow valve for controlling the flow of pressure fluid to and from anti-gravity apparel for aviators, is controlled in turn by the fluid pressure in a biassing chamber. This is coupled to the fluid supply and is vented through a path which offers to the flow of pressure fluid from the biassing chamber an impedance which varies with variations in the accelerational or gravitational forces applied to the apparatus.

---

This invention relates to fluid flow regulators, and is particularly concerned with regulators for controlling the flow of a pressurising fluid to and from an aviator's "G" garment or garments.

"G" garments, such as trousers, are worn by aviators who are manoeuvring their aircraft at such high speeds that a change of direction imposes upon the body a gravity or "G" loading which, if not counteracted, could cause draining of blood from the brain and consequent unconsciousness. A "G" garment contains inflatable elements which have to be filled with fluid at a pressure sufficient to counteract this effect, the pressure varying with the "G" loading. Pressure may be applied to parts of the abdomen and legs.

The invention consists in a valve for controlling the flow of fluid from a source of fluid under pressure, the valve comprising a valve member which is arranged for movement relative to a valve seat so that a plurality of orifices therein is progressively opened or uncovered sequentially for the passage of fluid therethrough, the movement of the valve member being in response to changes in gravity loading.

The orifices may be of different sizes, those orifices which are uncovered first by the progressive opening of the valve member being smaller than those which are uncovered subsequently.

The valve member is preferably arranged so as to be actuated by differential pressure.

A pilot valve element may be provided, the element being movable from one position to another to relieve the pressure acting on one side of the valve member for causing movement of the valve member relative to the seat. The pilot valve element may be actuated by a flexible diaphragm in response to a change in a pressure condition on one side thereof.

A change in the pressure condition may be caused by the actuation of at least one valve assembly in response to a change in gravity loading.

Figure 1:
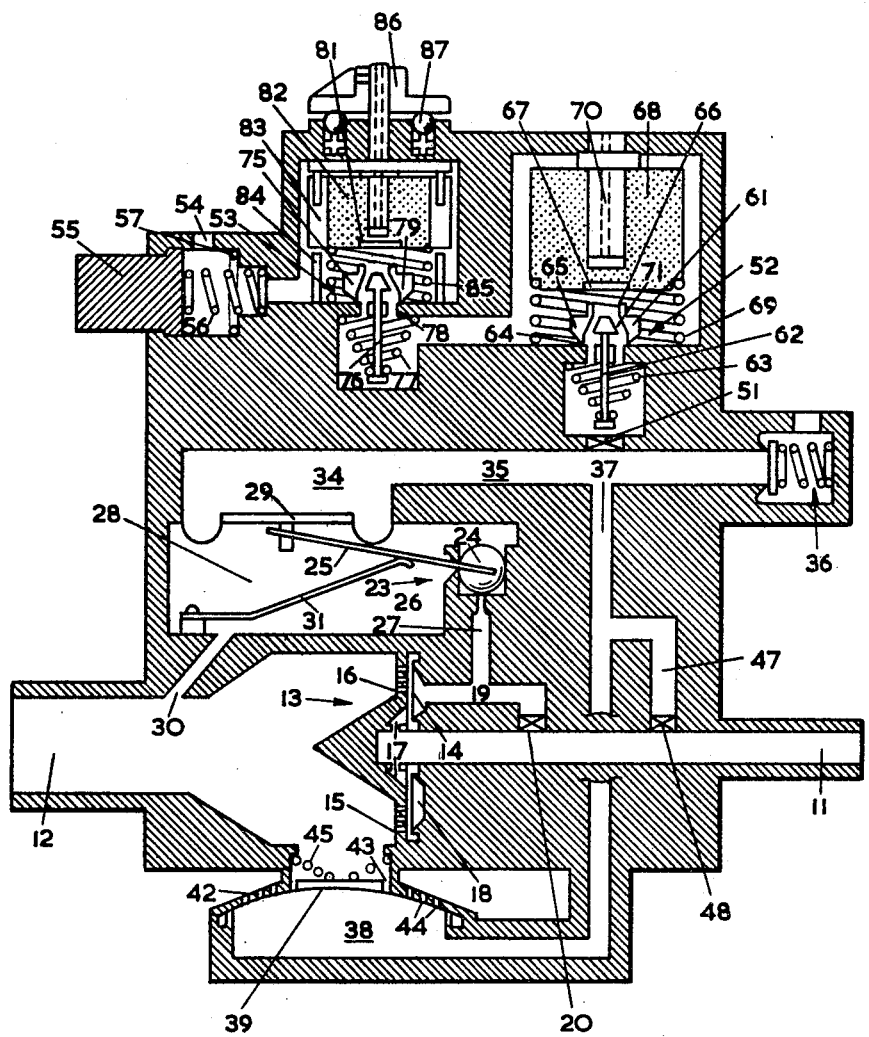
Figure 2:
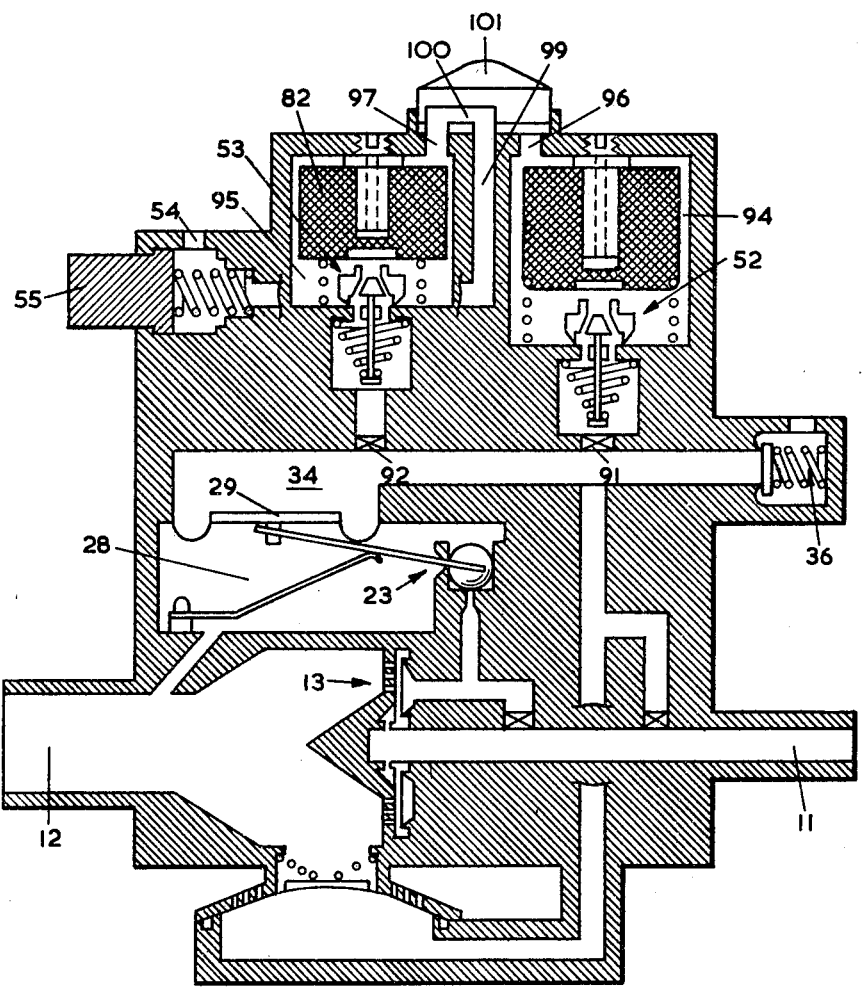
Figure 3:
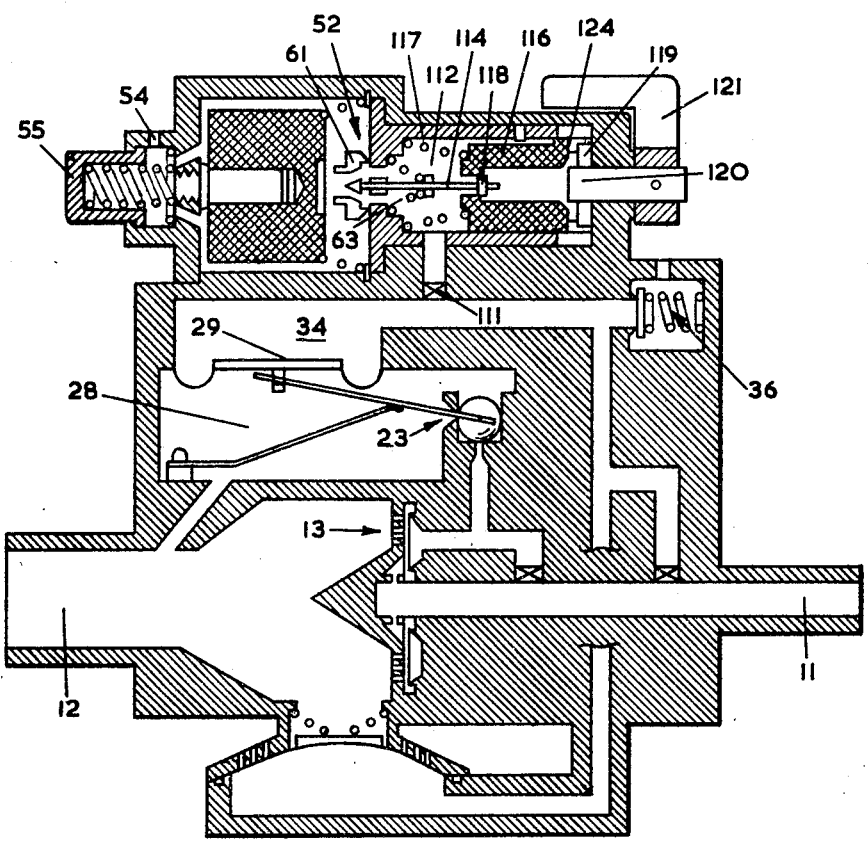
Figure 4:
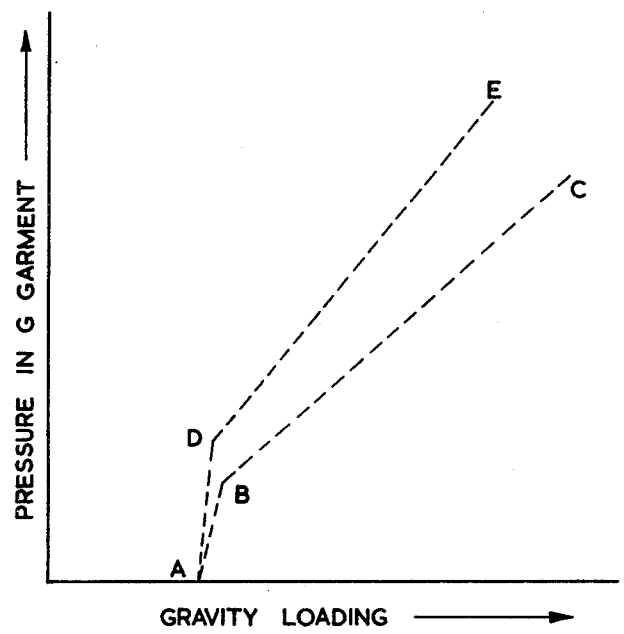
Figure 5:
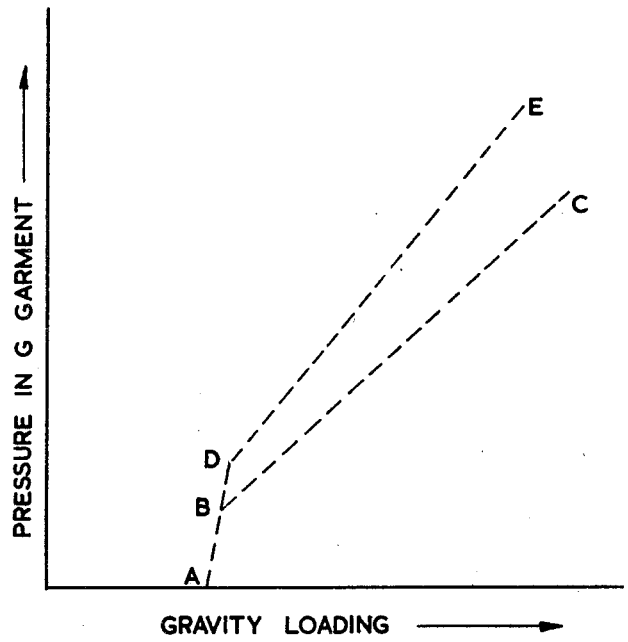

In order that the invention may be more clearly understood, embodiments thereof will now be described with reference to the accompanying drawings, in which:

FIG. 1 is a diagrammatic sectional view of a fluid flow regulator for controlling the flow of a pressurising fluid to and from an aviator's "G" garment, and embodying a valve constructed in accordance with the invention;

FIGS. 2 and 3 are diagrammatic sectional views of modified forms of the fluid flow regulator shown in FIG. 1; and FIGS. 4 and 5 are graphs illustrating the performance characteristics of the fluid flow regulators shown in FIGS. 1 and 3 respectively.

The regulator shown in FIG. 1 has an inlet passage 11 arranged for connection to a source (not shown) of pressurising fluid. It has been proposed to use compressed air as a pressurising fluid, but the present description will assume the use of oxygen under pressure from the aircraft's breathing oxygen supply, and for brevity in the description the pressurising fluid will be termed "oxygen."

A supply passage 12 is arranged for connection to an oxygen supply line and thence to an aviator's "G" garment (not shown). In between the inlet passage 11 and the supply passage 12 is a main valve, generally indicated by the reference numeral 13, comprising a valve member in the form of a flexible annular diaphragm 14, anchored at its inner and outer edges, and an annular valve seat 15 having a plurality of holes 16 therethrough, opening to the supply passage 12.

On the same side of the annular diaphragm 14 as the valve seat 15 is an annular passage 17 leading from the inlet passage 11. An annular chamber 18 is situated on the other side of the annular diaphragm 14, extending over the un-anchored area of the diaphragm 14 and communicating, via a passage 19 and a flow restrictor 20, with the inlet passage 11.

A pilot valve, generally indicated by the reference numeral 23, comprises a ball valve member 24 carrying an operating arm 25 and seating upon a pilot valve seat 26 lying between a passage 27, which communicates with the passage 19, and a chamber 28. A partly flexible control diaphragm 29 forms part of one wall of the chamber 28, and the underside of the diaphragm 29 engages the free end of the operating arm 25. The pilot valve 23 is biassed in the closed position by a leaf spring 31 which acts on the operating arm 25. A port 30 places the chamber 28 in communication with the outlet passage 12.

A control chamber 34 situated on the other side of the diaphragm 29 has a passage 35 leading therefrom to a relief valve 36. A reference pressure passage 37 leads from the passage 35 to an exhaust or dump valve chamber 38 which has part of one wall formed by a thin partly flexible diaphragm which acts as a dump valve member 39. The valve member 39 seats upon a dump valve seat 42 which has a relatively large central orifice 43 and a plurality of such smaller exhaust orifices 44 therein. The valve member 39 is shown in the closed position in FIG. 1, but a spring 45 is arranged so as normally to bias the valve member 39 in the open position.

The large central orifice 43 is then open, but it is closable on one side by the valve member 39 and is in communication on the other side with the supply passage 12. The exhaust orifices 44 open to the atmosphere.

The reference pressure passage 37 has a tapping 47 which leads, via a flow restrictor 48, to the inlet passage 11.

The passage 35, which is in communication with the reference pressure passage 37 and the control chamber 34, also has a damping orifice 51 opening therefrom and providing a path, through primary and secondary valve assemblies generally indicated by the reference numerals 52 and 53 respectively, to a port 54 which is normally open to the atmosphere. The port 54 may be closed by exerting sufficient digital pressure on a piston 55 to overcome the resistance of a spring 56 and cause the inner end of the piston 55 to seat against a sealing O-ring 57.

Between the damping orifice 51 and the port 54, the primary and secondary valve assemblies 52 and 53 are arranged in series and are of somewhat similar construction. The primary valve assembly 52 comprises a double-ended primary valve member 61 mounted at one end of a rod 62 and urged by a conical spring 63 to contact an annular valve seat 64 with its larger diameter end 65. The smaller diameter end 66 of the primary valve member 61 is positioned beneath a valve seat 67 consisting of a flexible rubber pad mounted on a primary weight 68 which is supported by a spring 69 and limited in movement so that it can only move towards and away from the valve member 61 on a stem 70. The primary valve member 61 has flow passages 71 passing therethrough.

The secondary valve assembly 53 comprises a double ended secondary valve member 75 mounted at one end of a rod 76 and urged by a conical spring 77 to contact an annular valve seat 78 with its larger diameter end 79. The smaller diameter end of the secondary valve member 75 is positioned beneath a valve seat 81 consisting of a flexible rubber pad mounted on a secondary weight 82.

The secondary weight 82 has two diametrically opposed slots 83 in its periphery, and with the weight 82 in the position shown in FIG. 1, these slots 83 are directly over two fixed stop pins 84. The weight 82 is supported on a spring 85 and can be turned manually by means of a knob 86 through an angle of 90° about its longitudinal axis. Ball detent locking means 87 are provided to fix the knob 86 at the limits of its travel. With the weight 82 in the position shown in FIG. 1, it is free to move downwards against the spring 85, the stop pins 84 entering the slots 83, so that the valve seat 81 engages the smaller diameter end 80 of the valve member 75.

With the weight 82 moved through an angle of 90° from the position shown, the slots 83 are no longer in alignment with the stop pins 84, which thus limit the downward movement of the weight 82 and prevent the engagement of the valve seat 81 with the smaller diameter end 80.

The operation of the regulator shown in FIG. 1 will first be described assuming that the various movable parts, except the diaphragm 39, are in the positions shown in the figure.

The annular diaphragm 14 of the main valve 13 is held in position shown, closing the plurality of holes 16 and the annular passage 17, by differential pressure. A large area of the diaphragm 14 is subjected to inlet oxygen pressure in the annular chamber 18 (via the flow restrictor 20 and the passage 19); this area is larger than the area on the other side of the diaphragm 14 which is subjected to the inlet oxygen pressure via the inlet passage 11 and annular passage 17. The main valve 13 remains closed as long as the pilot valve 23 is closed, for no oxygen flow takes place along the passage 27 leading to the pilot valve 23.

Oxygen bleeds through the flow restrictor 48 to the passages 47, 37 and 35 and passes through the damping orifice 51. While the primary and secondary valve assemblies 52 and 53 are open as shown, there is no obstacle to the flow of oxygen to atmosphere through the port 54, and thus there is no build-up of pressure in the passages 47, 37 and 35 and the control chamber 34. The primary and secondary valve assemblies 52 and 53 will close, in a manner to be described, when the regulator is subjected to gravity loading, and oxygen pressure thus builds up, increasing the pressure in the control chamber 34 and forcing the control diaphragm 29 into the chamber 28. This movement of the control diaphragm 29 tilts the operating arm 25 and unseats the ball valve member 24 of the pilot valve 23, allowing flow of oxygen through the pilot valve 23 from the passage 27 and thus reducing the oxygen pressure in the annular chamber 18.

The annular diaphragm 14 is then unseated by the inlet oxygen pressure in the passage 17. The diaphragm 14 unseats progressively, i.e. it uncovers first the holes 16 nearest to the passage 17, then with increasing opening of the pilot valve 23 the next holes 16 are uncovered, and so on. Oxygen thus flows through the main valve 13 to the supply passage 12 and thence to the aviator's "G" garment (not shown), inflating it to protect him against the undesirable consequences of the increased gravity loading as previously described.

The increase of pressure in the passage 37 also affects the dump valve chamber 38. The diaphragm 39 is biassed in the open position by means of the spring 45, whereas the pilot valve 23 is biassed in the closed position by means of the leaf spring 31. By arranging for the pressure in the control chamber 34 required to open the pilot valve 23 to be larger than the pressure required in the dump valve chamber 38 to seat the diaphragm 39, it is possible to ensure that when oxygen pressure increases in the passages 47, 37 and 35, and the chambers 34 and 38, the diaphragm 39 is pressed against the dump valve seat 42, closing the central orifice 43 and the exhaust orifices 44 before the pilot valve 23 opens. The diaphragm 39 remains in this position while gravity loading persists, the central portions being subjected to a pressure differential across the central orifice 43 which is equal to the difference in the biassing pressures on the diaphragm 39 and on the control diaphragm 29, and those portions of the diaphragm 39 which lie across the exhaust orifices 44 being subjected to a pressure differential equal to the difference between atmospheric pressure and the pressure in the dump valve chamber 38.

When the gravity loading is removed, the primary and secondary valve assemblies 52 and 53 once more allow free flow of oxygen from the damping orifice 51 through the port 54 to atmosphere. The pilot valve 23 closes allowing build-up of oxygen pressure in the annular chamber 18 to close the main valve 13 and cut off the supply of oxygen to the "G" garment.

With the fall in pressure in the control chamber 34, passages 35 and 37, and dump valve chamber 38, the pressure differential across the central portion of the diaphragm 39 is reduced and the diaphragm 39 moves away from the dump valve seat 42, progressively exposing the exhaust orifices 44 and allowing the oxygen under pressure in the supply line and "G" garment to be "dumped" to the atmosphere.

A more detailed description of the operation of the primary and secondary valve assemblies 52 and 53 will now be given. It will first be assumed that the knob 86 has been operated to turn the secondary weight 82 through 90° from the position shown in FIG. 1, and thus to limit its downward movement.

When a gravity loading is applied to the regulator, the primary weight 68 moves against the spring 69 and eventually the valve seat 67 is forced into contact with the smaller diameter end 66 of the double-ended valve member 61. This restricts the flow of oxygen to atmosphere, causing a build-up of oxygen pressure as previously described, operating the pilot valve 23 and opening the main valve 13.

As the gravity loading increases, the flow of oxygen past the valve seat 67 is further restricted, increasing the pressure in the control chamber 34 and thus further opening the pilot valve 23 to cause more venting of gas from the passages 27 and 19 and the annular chamber 18, and further opening of the main valve 13. There is thus a corresponding increase of pressure in the supply line 12 and the "G" garment, and in fact this increase is proportional to the increase in gravity loading. This is illustrated in FIG. 4 by the straight line labelled A–B.

With further increase in gravity loading, there is a consequent further increase in the pressure in the control chamber 34 and the passages 35 and 37, and when this pressure is high enough, the double-ended valve member 61 is unseated from the annular valve seat 64, against the conical spring 63 and against the gravity loading tending to force the primary weight 68 towards the double-ended valve member 61.

Subsequent increase in gravity loading causes a proportionally reduced pressure rise in the "G" garment, the proportion being in the ratio of the areas of the valve seats and being illustrated in FIG. 4 by the straight line labelled B–C.

The gravity loading also affects the secondary weight 82, but when the weight 82 has been turned through 90° from the position shown in FIG. 1, its movement is limited by the stop pins 84 and the valve seat 81 does not contact the smaller diameter end 80 of the double ended valve member 75. The secondary valve assembly 53 thus has no effect on the pressure in the "G" garment.

In certain circumstances it is desirable to have a somewhat different pressure produced in the "G" garment in response to the same gravity loading. The regulator shown in FIG. 1 can be used to produce the pressures in the "G" garment illustrated in FIG. 4 by the straight lines A–D and D–E by turning the knob 86 to the position shown in FIG. 1.

In this case, when the gravity loading on the regulator increases, the primary valve assembly 52 is actuated as previously described, and the secondary valve assembly 53 is actuated in a closely similar manner. Flow of oxygen through the secondary valve assembly 53 is thus restricted, increasing the oxygen pressure upstream and so increasing the loading on the double-ended valve member 61.

This requires an increased pressure in the control chamber 34 before the double-ended valve member 61 will be unseated from the annular valve seat 64, and so a higher pressure is produced in the "G" garment for the same gravity loading. This is represented in FIG. 4 by the line A–D.

The line D–E in FIG. 4 has a somewhat similar interpretation to the line B–C: from the point D onwards, the load on the double-ended valve member 75, due to the effect of the conical spring 77 and to the gravity loading on the secondary weight 82, is being overcome by the oxygen pressure on the double-ended valve member 75. Venting of oxygen between the annular valve seat 78 and the larger diameter end 79 of the secondary valve assembly 53 reduces the rate of increase of the upstream oxygen pressure with increase of gravity loading and decreases the loading on the double-ended valve member 61 of the primary valve assembly 52.

For the lines A–D and D–E, the effect of the secondary valve assembly 53 is being added to that of the primary valve assembly 52.

The relief valve 36 limits the maximum pressure which can build up in the control chamber 34 and passages 35 and 37, which in turn limits the maximum pressure which can be applied to the "G" garment.

By pressing the piston 55 inwards to close the port 54, the flow of oxygen to atmosphere through the restrictor 48 and orifice 51 is stopped, causing a build up of pressure in the control chamber 34, limited by the relief valve 36, and enabling the operation of the pilot valve 23 and the main valve 13, together with that of the supply line and "G" garment, to be tested in the absence of an increased gravity loading on the regulator.

The modified form of regulator shown in FIG. 2 is generally similar in construction to the regulator of FIG. 1, and the same reference numerals have been used to identify similar parts.

Two damping orifices 91 and 92 open from the passage 35 to chambers 94 and 95 in which are located the primary and secondary valve assemblies 52 and 53 respectively. The chambers 94 and 95 have vent ports 96 and 97 respectively capable of being opened to atmosphere.

Either of the vent ports 96 and 97 can be placed into communication with a passage 99 which leads to atmosphere via the port 54, the communication being by way of a bridging passage 100 in a rotatable control knob 101. The bridging passage 100 can link either of the vent ports 96 and 97 with the end of the passage 99; the control knob 101 is arranged to close the other vent port at the same time, and to be spring loaded so that it can remain only in one position or the other and not in an intermediate position.

With the control knob 101 in the position shown in FIG. 2 the primary valve chamber 94 has its vent port 96 closed, and so the primary assembly 52 is inoperative. Oxygen passing through the damping orifice 92 to the secondary valve assembly 53 operates the assembly in a manner similar to that described with reference to FIG. 1, giving a performance represented by the lines A–B and B–C.

If the control knob 101 is turned to close the vent port 97 of the secondary valve chamber 95, the secondary valve assembly 53 becomes inoperative and the primary valve assembly 52 controls the performance of the regulator in a manner represented by the lines A–D and D–E in FIG. 4. Each valve assembly is arranged to give the required performance independently of the other.

The modified form of regulator shown in FIG. 3 is also generally similar in construction to the regulator of FIG. 1, and the same reference numerals have been used to identify similar parts.

A single damping orifice 111 opens from the passage 35 to a valve chamber 112 which is in communication with the atmosphere at the port 54 through the primary valve assembly 52. The double-ended valve member 61 of the primary valve assembly 52 has a longer rod 114 than the corresponding rod 62 in FIG. 1, but the rod 114 is acted upon by a similar conical spring 63.

A secondary weight 116 can be urged by a conical spring 117 into contact with a collar 118 on the end of the rod 114. A pin 119 fitted at right angles to an actuating stem 120 can be rotated by means of a control knob 121. The pin 119 meets a cam profile 124 at the right-hand end of the secondary weight 116 as seen in FIG. 3, and turning the pin 119 causes the secondary weight 116 to move to the left against the action of the conical spring 117 and out of engagement with the collar 118.

Considering first the condition in which the secondary weight 116 has been moved out of engagement with the collar 118, the primary valve assembly 52 operates as described with reference to the embodiment of FIG. 1, and the performance characteristics of the regulator are represented by the lines A–B and B–C in FIG. 5.

With the secondary weight 116 in engagement with the collar 118, the double-ended valve member 61 has the extra load of the spring 117 and the weight 116 to lift against, and the initial performance characteristic of the regulator is extended to the point D in FIG. 5. The added effect of the secondary weight 116 after this point gives the performance characteristics represented by the line D–E.

The construction of the cam profile 124 has the advantage that it is possible to change the operation of the regulator from the A–D and D–E performance characteristic while gravity loading is being experienced.

The embodiment of FIG. 2 already permits such a change to be made, with the connection as shown, by moving the control knob 101 from one position to the other.

The embodiment of FIG. 1 could be adapted to permit such a change, for example by cutting the slots 83 in the secondary weight 82 so as to present a suitable cam profile to the pins 84. The secondary weight 82 can then be lifted while gravity loading is being experienced.

I claim:

1. Apparatus for controlling the flow of pressure fluid to and from anti-gravity apparel, including a main fluid-flow control valve positioned in a conduit extending between an inlet for pressure fluid and an outlet for connection to the apparel, the valve being biassed to its closed position by a force which varies with variations in the pressure in a biasing chamber which is in fluid communication with the conduit upstream of the main valve, the chamber being connected to a vent through a path of which the impedance to fluid flow varies with variations in the accelerational or gravitational forces applied to the apparatus, in which the said path includes at least one auxiliary fluid-flow impedance valve including a valve head which is spaced from an associated first valve seat by a distance which varies with variations in the gravitational forces on the apparatus, the fluid flowing to the vent through a variable space between the impedance valve head and first seat.

2. The apparatus claimed in claim 1, in which there are two impedance valves connected in cascade.

3. The apparatus claimed in claim 1, in which there are two impedance valves having their inlets connected in parallel to the said biassing chamber, and having their outlets adapted to be placed alternatively in communication with the vent.

4. The apparatus claimed in claim 1, in which when there are at least two impedance valves, one of them is engaged by a cam at its end removed from the valve head, the cam being adapted to control movement of the respective weight relative to the valve head.

References Cited

UNITED STATES PATENTS

| | | | |
|---|---|---|---|
| 2,609,660 | 9/1952 | Tenney. | |
| 2,620,791 | 12/1952 | Versoy | 137—39 X |
| 2,748,786 | 6/1956 | Isreeli | 137—38 |
| 2,861,583 | 11/1958 | Colliver | 137—39 |
| 2,946,339 | 7/1960 | Fairchild | 137—38 |
| 3,000,395 | 9/1961 | Waterfill | 137—512.15 |
| 3,071,128 | 1/1963 | Cramer | 137—38 X |
| 3,158,149 | 11/1964 | Gray | 137—38 X |

CLARENCE R. GORDON, Primary Examiner

U.S. Cl. X.R.

137—625.12, 628; 251—28, 33, 61.1